(12) United States Patent
Chu

(10) Patent No.: US 6,644,898 B2
(45) Date of Patent: Nov. 11, 2003

(54) REPAIRING DEVICE FOR REPAIRING THREADED MOUTHS OR PORTS

(76) Inventor: Henry C. Chu, 133 N. Lemon St., Orange, CA (US) 92866

( * ) Notice: Subject to any disclaimer, the term of this patent is extended or adjusted under 35 U.S.C. 154(b) by 0 days.

(21) Appl. No.: 10/119,396

(22) Filed: Apr. 11, 2002

(65) Prior Publication Data

US 2003/0194285 A1 Oct. 16, 2003

(51) Int. Cl.⁷ .............................................. B23B 45/00
(52) U.S. Cl. .................. 408/97; 408/115 B; 408/241 B
(58) Field of Search .................... 408/72 R, 72 B, 408/97, 84, 111, 137, 115 R, 115 B, 241 B, 79, 80, 110; 7/157; 29/888.01, 888.021, 402.19, 402.06

(56) References Cited

U.S. PATENT DOCUMENTS

| 379,351 A | * | 3/1888 | Weiss ......................... 408/111 |
| 673,689 A | * | 5/1901 | Reil ............................ 408/104 |
| 1,163,232 A | * | 12/1915 | Greif .......................... 408/72 R |
| 1,293,143 A | * | 2/1919 | McKenzie ................. 408/72 R |
| 2,226,005 A | * | 12/1940 | Lodge .......................... 408/111 |
| 2,501,000 A | * | 3/1950 | Murphey ..................... 451/461 |
| 2,670,639 A | * | 3/1954 | Flowers et al. ............... 408/54 |
| 4,057,890 A | * | 11/1977 | Feen .......................... 29/426.4 |
| 5,879,112 A | * | 3/1999 | Ivey ............................ 408/204 |

* cited by examiner

*Primary Examiner*—Daniel W. Howell
(74) *Attorney, Agent, or Firm*—Charles E. Baxley

(57) ABSTRACT

A repairing device for repairing a threaded port includes a housing for threading to the threaded port and having an inner thread for threading with a barrel. One or more machining tools may be changeably and rotatably secured in the barrel with bearings, each may include a cutting blade for engaging with the port and for machining and repairing one or more surfaces of the port. The machining tools may be detachably secured to the barrel with a retaining ring, for allowing the cutting blades of the machining tools to machine and, repair various surfaces or threads of the ports.

5 Claims, 4 Drawing Sheets

REPAIRING DEVICE FOR REPAIRING THREADED MOUTHS OR PORTS

BACKGROUND OF THE INVENTION

1. Field of the Invention

The present invention relates to a repairing device, and more particularly to a repairing device for repairing the threaded mouths, ports, couplers, etc.

2. Description of the Prior Art

Various kinds of objects may include one or more typical threaded mouths, ports, couplers, etc., for coupling to the air or fluid flowing passages or tubings or the like. For example, the vehicle parts, such as the accumulators, the engines, the evaporators, the receiver dryers, the cylinder heads, the compressors, the condensers, etc., may each include one or more typical threaded mouths, ports, couplers thereon, which may be easily damaged while these parts are worked with or moved or assembled by the workers. For example, while moving the heavy engines or evaporators, the mouths or ports may be easily damaged by striking onto the other objects.

Normally, the typical threaded mouths, ports, or couplers are exposed, and extended outward of the vehicle parts, and thus will be easily damaged by the other objects, or when the threaded mouths, ports, or couplers are hit or stricken onto the other objects. When the threads of the threaded mouths, ports, or couplers are damaged, the threaded mouths, ports, or couplers may no longer be used to be coupled to the other tubings or elements or members. In addition, when the outer surfaces of the threaded mouths, ports, couplers are damaged, the couplings between the threaded mouths, ports, or couplers and the other tubings or members may no longer be made with a water tight or an air tight seal therebetween.

Typically, once the typical threaded mouths, ports, or couplers are damaged, the .workers have to move the vehicle parts to a drilling or milling or the other machining devices, and to clamp the vehicle parts to the machining devices with the clamps. In addition, before the threaded mouths, ports, or couplers have been repaired by the machining devices, the vehicle parts, that are typically manufactured with molding or die casting processes, may have a good chance to be damaged by the clamps.

Furthermore, the repairing persons or the workers have to carefully align the threaded mouths, ports, or couplers with the cutting tools of the machining devices and have to adjust the threaded mouths, ports, or couplers with the cutting tools again and again, with a try and error method or process, until the threaded mouths, ports, or couplers have been precisely aligned with the cutting tools. Accordingly, it has become a difficult and troublesome work to repair the typical threaded mouths, ports, or couplers.

The present invention has arisen to mitigate and/or obviate the afore-described disadvantages of the conventional repairing devices for the typical threaded mouths, ports, or couplers.

SUMMARY OF THE INVENTION

The primary objective of the present invention is to provide a repairing device for easily repairing the threaded mouths, ports, couplers, etc., without moving the threaded mouths, ports, or couplers to the machining devices.

The other objective of the present invention is to provide a repairing device for easily repairing the threaded mouths, ports, couplers, etc. without carefully aligning the threaded mouths, ports, or couplers with the cutting tools.

The further objective of the present invention is to provide a repairing device including one or more cutting tools that may be changed with each other for easily repairing the threaded mouths, ports, or couplers, of various kinds of vehicle parts.

In accordance with one aspect of the invention, there is provided a repairing device for repairing a surface of a threaded port, the repairing device comprising a housing for threading to the threaded port, the housing including an inner thread formed therein, a barrel including an outer thread formed thereon for threading with the inner thread of the housing and for securing the barrel to the housing, the barrel including a bore formed therein, and at least one machining tool rotatably secured in the bore of the barrel, and including a cutting blade for engaging with the port and for machining and repairing the surface of the port.

The housing includes an end panel having an orifice formed therein and having an inner thread formed in the orifice of the housing for threading with the threaded port.

One or more bearings may further be provided and engaged between the machining tool and the barrel for rotatably securing the machining tool in the bore of the barrel.

A retaining ring may further be provided and engaged with the machining tool for detachably securing the machining tool to the barrel.

A handwheel may further be provided and detachably secured to the machining tool for rotating the machining tool relative to the barrel.

The barrel includes a conduit extended therefrom and having outer thread thereof formed on the conduit for threading with the inner thread of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
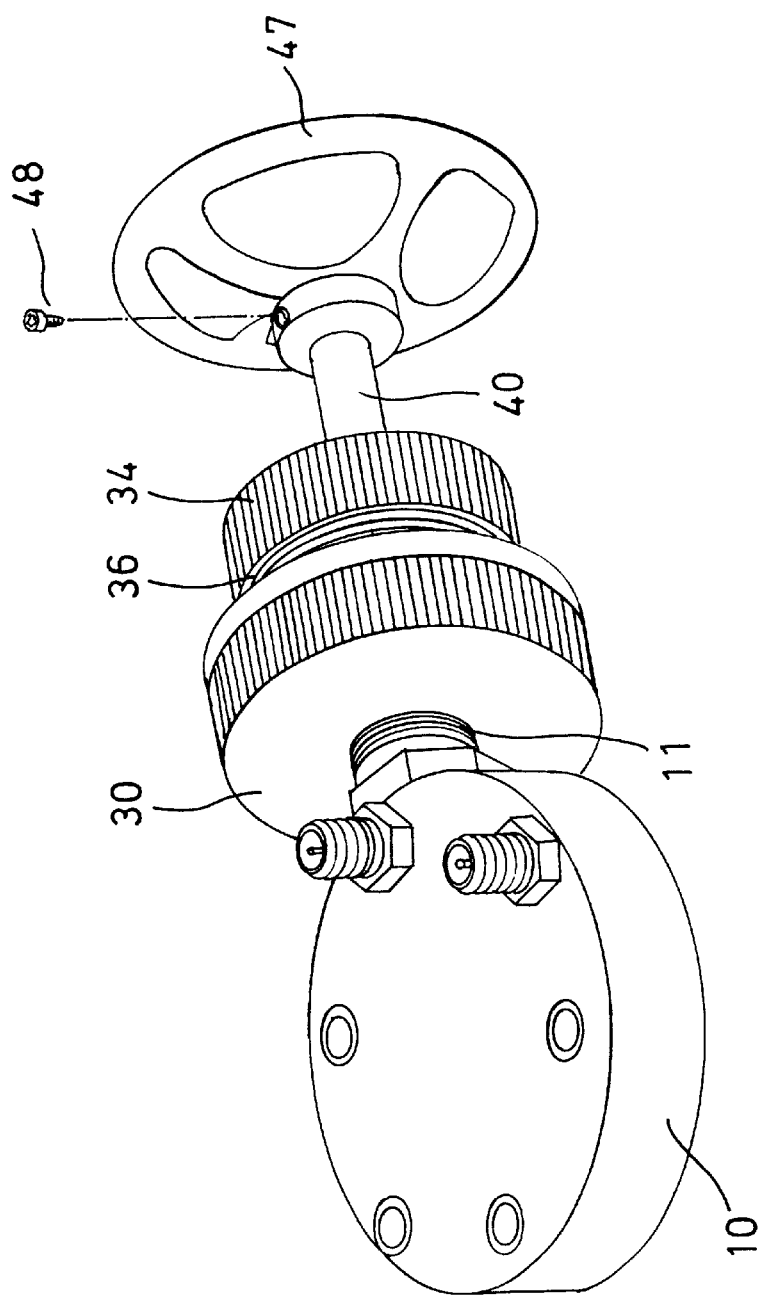
FIG. 1 is a perspective view of a repairing device in accordance with the present invention.
Figure 2:
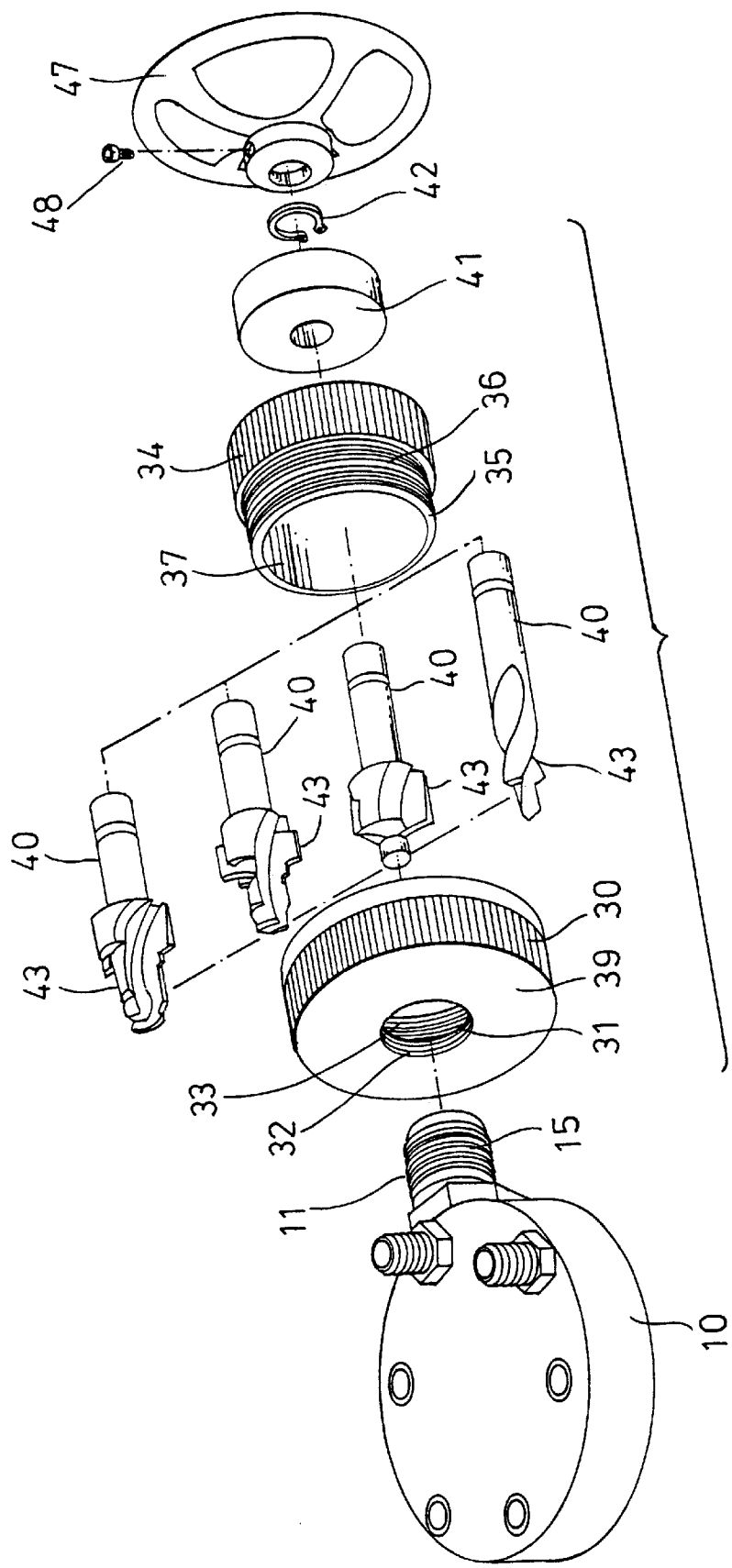
FIG. 2 is an exploded view of the repairing device.
Figure 4:
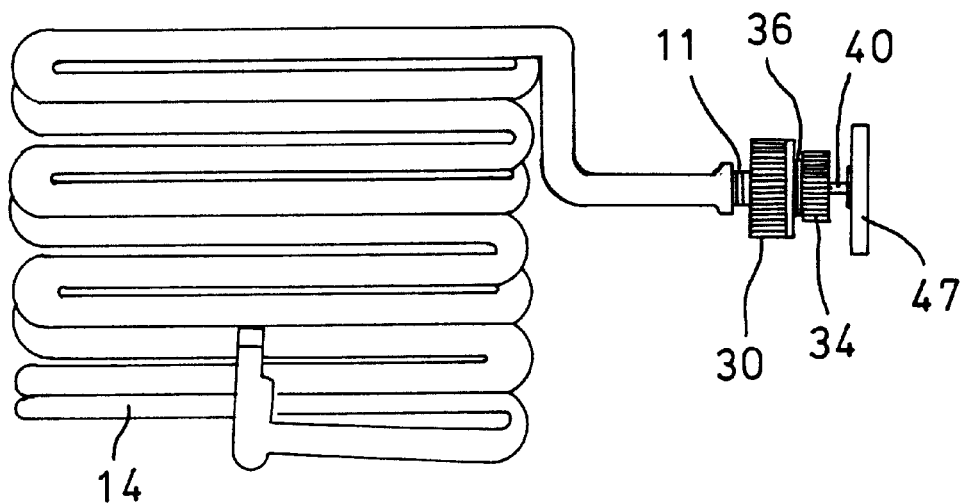
FIGS. 3 and 4 are plane schematic views illustrating the operation of the repairing device for the vehicle parts.
Figure 3:
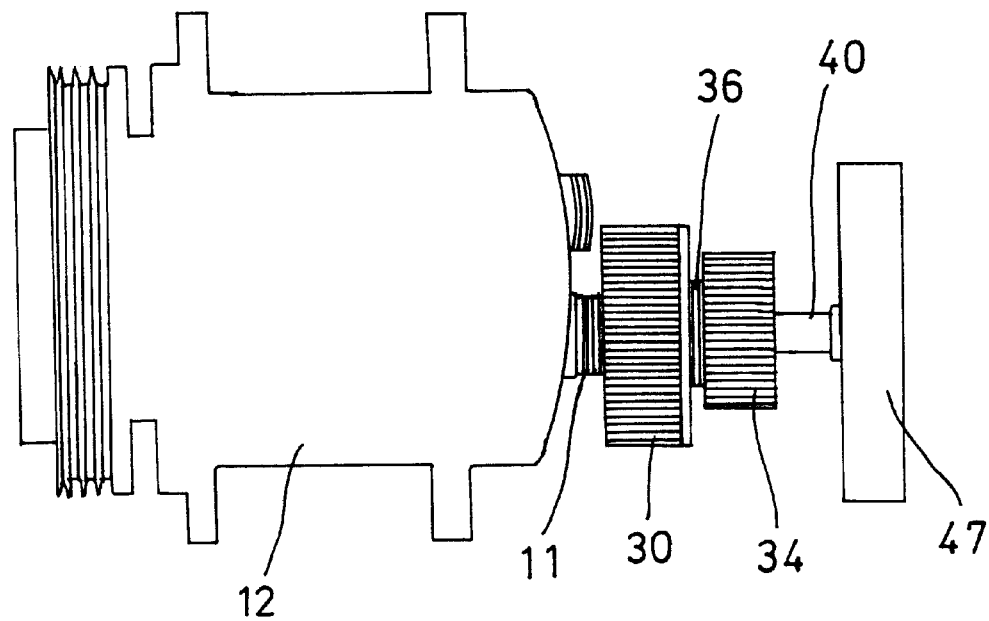

Referring to the drawings, and initially to FIGS. 1–4, a repairing device in accordance with the present invention is provided for repairing the outer or inner threads and/or the outer or inner peripheral surfaces of the typical threaded mouths, couplers, or ports of the typical vehicle parts, such as the accumulators, the engines, the receiver dryers, the cylinder heads 10 (FIGS. 1, 2), the compressors 12 (FIG. 3), the condensers, the evaporators 14 (FIG. 4), etc.

Figure 5:
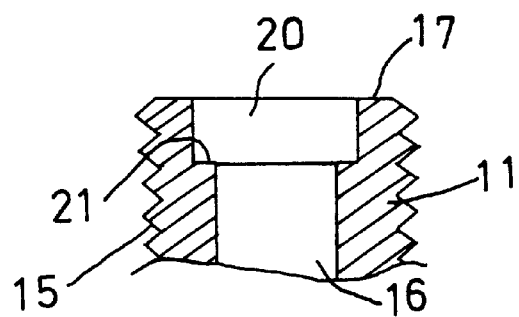
FIGS. 5, 6, 7 are partial cross sectional views illustrating various kinds of mouths or ports that may be repaired with the repairing device.
Figure 6:
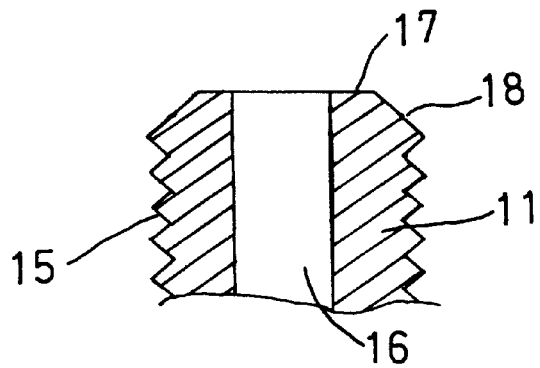
Figure 7:
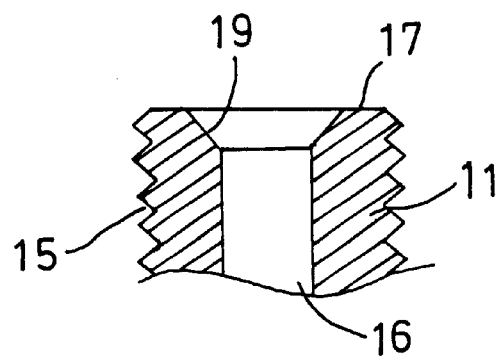

As shown in FIGS. 1 and 5–7, the threaded mouths, couplets, or ports 11 may each include an outer thread 15 and/or an inner thread (not shown) formed or provided therein, and may each include an aperture 16 formed therein, and/or one or more flat end surfaces 17, and/or one or more inclined or rounded outer peripheral surfaces 18 (FIG. 6), and/or one or more inclined or rounded inner peripheral surfaces 19 (FIG. 7), and/or an opening 20 (FIG. 5) having an inner diameter greater than that of the aperture 16 of the ports 11, for forming a peripheral shoulder 21 between the aperture 16 and the opening 20 of the ports 11.

The repairing device comprises a housing 30 preferably including a cylindrical shape and including an orifice 31 formed in one end panel 39 thereof, and including an inner thread 32 formed in the orifice 31 of the housing 30, for threading with the outer thread 15 of the ports 11. The housing 30 further includes a chamber formed therein having an inner thread 33 formed therein. It is to be noted that the outer threads 15 of the ports 11 that have been scratched or scraped or damaged by the other objects, may be threaded and repaired by the inner thread 32 of the housing 30 when the housing 30 is threaded onto the ports 11.

The repairing device further includes a barrel 34 having a conduit 35 extended therefrom and having an outer thread 36 formed on the outer peripheral portion of the conduit 35 for threading with the inner thread 33 of the housing 30, and for allowing the barrel 34 to be secured onto the housing 30. The barrel 34 and/or the conduit 35 include a bore 37 formed therein.

One or more cutting or machining tools 40 may each be rotatably and detachably secured in the bore 37 of the barrel 34 with one or more bearings 41 and a retaining ring 42. The machining tools 40 may each include a cutting blade 43 for engaging with the ports 11 and for cutting or machining or repairing the surfaces 17, 18, 19 and/or the shoulders 21 of the ports 11. A ferrule or a handwheel 47 may further be provided and detachably secured onto the machining tools 40 for rotating the machining tools 40 to machine or repair the surfaces 17, 18, 19 and/or the shoulders 21 of the ports 11.

It is to be noted that, while attaching or threading onto the port 11, the housing 30 may be suitably aligned or centered relative to the port 11, such that the machining tools 40 may also be precisely aligned with the surfaces 17, 18, 19 and/or the shoulders 21 of the ports 11 to be machined when the machining tools 40 are secured onto the housing 30 with the barrel 34. The machining tools 40 may thus be easily rotated to cut or machine or repair the surfaces 17, 18, 19 and/or the shoulders 21 of the ports 11, by any workers without experienced or specially trained persons or experts. The machining tools 40 may be easily changed with each other for machining or repairing various kinds of surfaces or shoulders.

The machining tools 40 of the repairing device may also include a taper (not shown) for tapering or for repairing an inner thread of the ports 11. The housing 30 and/or the barrel 34 may include a serrated or coarse outer peripheral surface for allowing the housing 30 and the barrel 34 to be easily rotated by the users or workers.

In operation, as shown in FIGS. 1–4, the repairing device may be easily moved to the vehicle parts that have various kinds of ports required to be repaired or machined, and may be easily centered to the ports with the housing 30, without try and error processes.

Accordingly, the repairing device in accordance with the present invention may be used for easily repairing the threaded mouths, ports, couplers, etc., without moving the threaded mouths, ports, or couplers to the machining devices, and without carefully aligning the threaded mouths, ports, or couplers with the cutting tools, and including one or more cutting tools that may be changed with each other for easily repairing the threaded mouths, ports, or couplers, of various kinds of vehicle parts.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A repairing device for repairing a surface of a threaded port, said repairing device comprising:

a housing for threading to the threaded port, said housing including an inner thread formed therein, said housing including an end panel having an orifice formed therein and having an inner thread formed in said orifice of said housing for threading with said threaded port, a barrel including an outer thread formed thereon for threading with said inner thread of said housing and for securing said barrel to said housing, said barrel including a bore formed therein, and at least one machining tool rotatably secured in said bore of said barrel, and including a cutting blade for engaging with the port and for machining and repairing the surface of the port.

2. The repairing device according to claim 1, wherein said barrel includes a conduit extended therefrom and having said outer thread thereof formed on said conduit for threading with said inner thread of said housing.

3. The repairing device according to claim 1 further comprising at least one bearing engaged between said at least one machining tool and said barrel for rotatably securing said at least one machining tool in said bore of said barrel.

4. The repairing device according to claim 3 further comprising a retaining ring engaged with said at least one machining tool for detachably securing said at least one machining tool to said barrel.

5. The repairing device according to claim 1 further comprising a handwheel detachably secured to said at least one machining tool for rotating said at least one machining tool relative to said barrel.

* * * * *